C. W. MALLINS.
WHEEL FENDER.
APPLICATION FILED JUNE 8, 1912.
1,181,605.
Patented May 2, 1916.
2 SHEETS—SHEET 2.
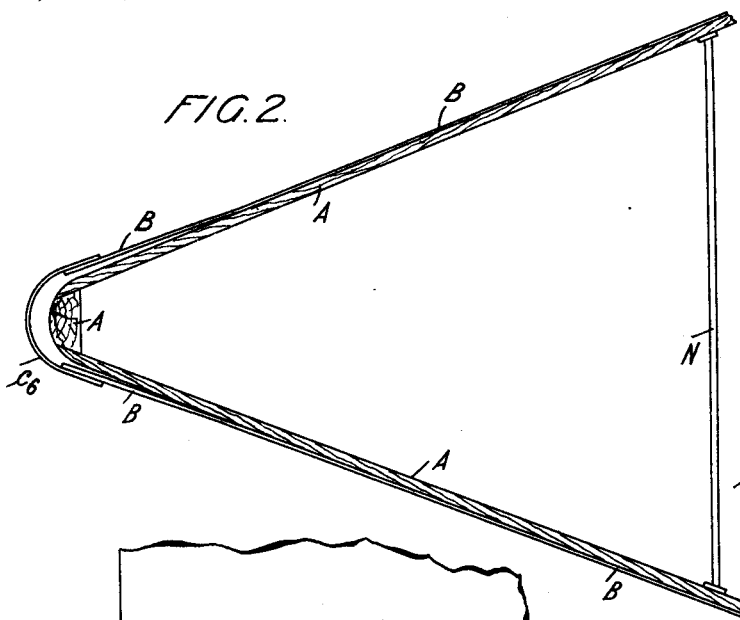
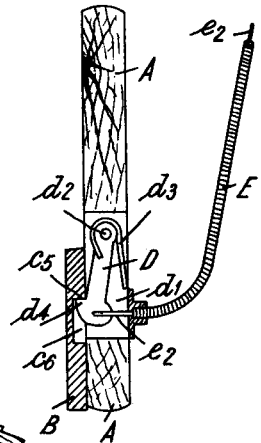
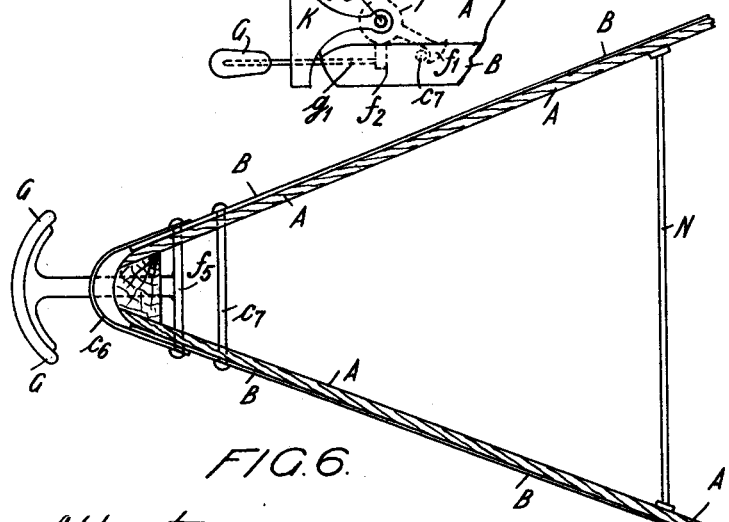
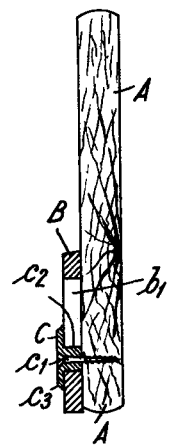
Attest
H. M. Barrett
H. L. Alden
Inventor
Charles William Mallins
by Spear, Middleton, Donaldson & Spear
Attys

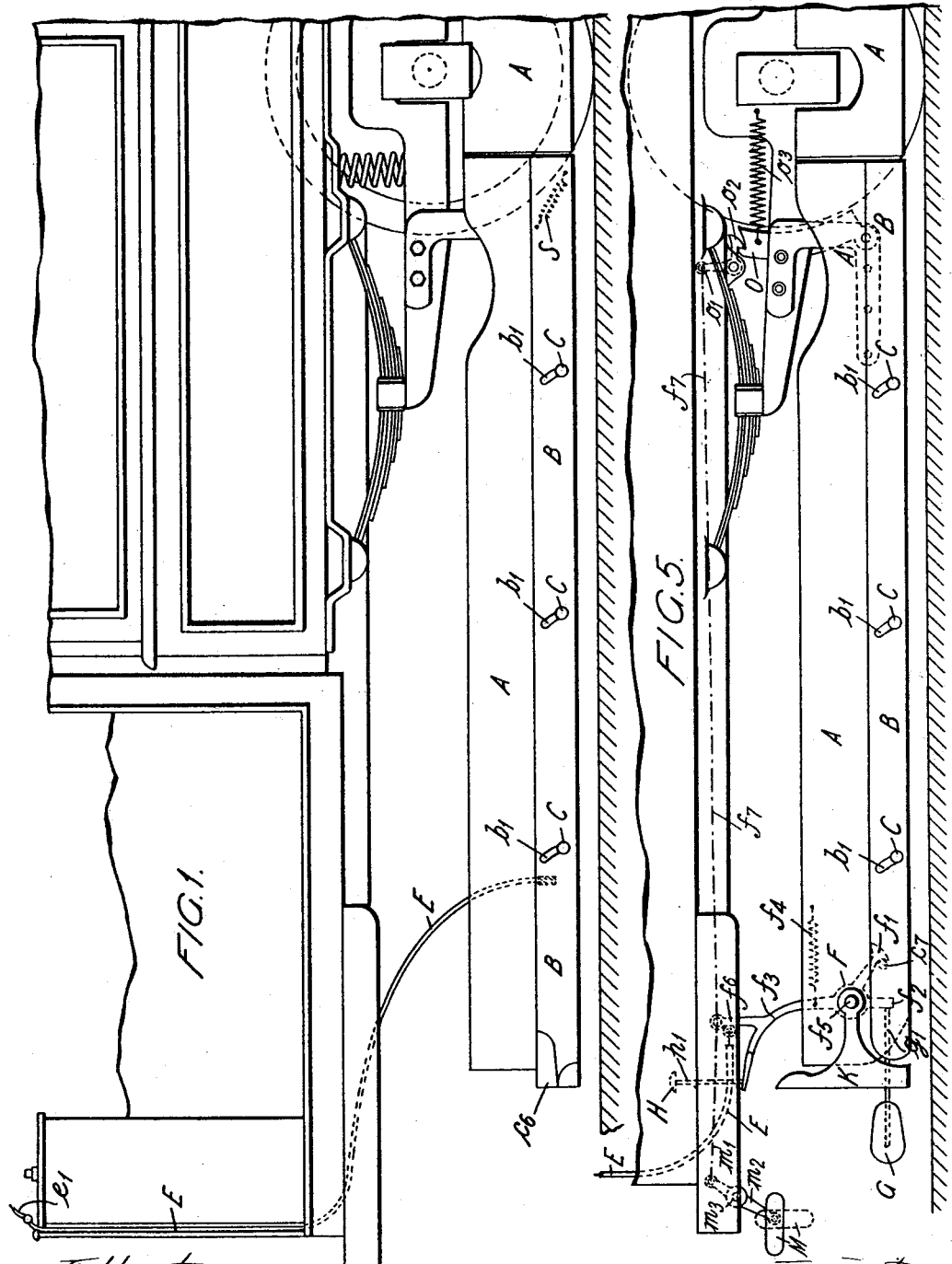

UNITED STATES PATENT OFFICE.

CHARLES W. MALLINS, OF BLUNDELLSANDS, NEAR LIVERPOOL, ENGLAND.

WHEEL-FENDER.

1,181,605.  Specification of Letters Patent.  Patented May 2, 1916.

Application filed June 8, 1912. Serial No. 702,527.

*To all whom it may concern:*

Be it known that I, CHARLES WILLIAM MALLINS, a subject of the King of Great Britain, and residing in Blundellsands, near Liverpool, in the county of Lancaster, England, have invented certain new and useful Improvements in Wheel-Fenders, of which the following is specification.

This invention relates to wheel fenders for tram-cars and the like vehicles, and refers more particularly to improvements in that type of wheel fender known as the pilot type life-guard which comprises a board or buffer, carried mainly by the truck-frame of the car and extending around the car outside the wheels, the front sides and the rear side forming V's, the respective apices of which extend under the platform. This guard is carried down as nearly to the ground as is practicable, but for obvious reasons there must be a narrow space between the bottom of the guard and the roadway, and it is the object of the present invention to provide an additional guard for this space, so arranged that it shall by an act of the driver, or automatically, move so as to close-in the said space and so prevent any small object—a child's arm for instance—from being drawn in under the pilot guard.

Broadly described the invention comprises an extension guard carried on the V shaped front and rear of the pilot guard, and so articulated and controlled that the bottom of the extension guard is normally quite clear of the road-way, but so that when the driver foresees the possibility of an accident he may, by a momentary act, instantly release the extension guard, and, where desired, the arrangement may be such that when a movable buffer or the like meets an obstruction the extension guard is automatically released; in either case, upon release, the extension guard drops so that the bottom edge rests on the ground, the extension guard covering-in and protecting the space between the bottom of the pilot guard and the ground. The release of the extension guard may also bring a brake into operation, so as to bring the car to a standstill.

The invention is illustrated in the accompanying drawings, in which;—Figure 1 is an elevation of a car fitted with the pilot-guard with the present invention applied thereto, but without the automatic features, Fig. 2 being a corresponding part plan view of the pilot-guard and the extension guard, and Figs. 3 and 4 being detail views. Fig. 5 is a view, similar to Fig. 1, and showing an alternative form of the invention in which the extension guard may be released either automatically, when a buffer meets an obstruction, or independently by the driver, the release of the extension guard operating a brake; Fig. 6 is a corresponding part plan. Fig. 7 is an elevation of a further modification.

Referring in the first instance to Figs. 1 to 4;—A is the V shaped part of the pilot-guard which extends in front and in rear of the wheels, the front part only being shown, and B is the movable extension guard carried on the pilot-guard; it will be understood that an arrangement as shown will be in front whether the car be running in the one direction or the other. The extension guard may be articulated to the guard in any convenient manner; according to the mode illustrated, the extension guard is provided with a series of oblique slots $b^1$ in each of which loosely fits a stud C secured to the guard by screws $c^1$, the body part $c^2$ of the stud guiding the slots, and the head $c^3$ retaining the extension guard in position laterally. If otherwise unsupported the extension guard would, either by virtue of its weight, or by its weight assisted by a spring S, located in a recess formed in the guard and extension guard, drop until its lower edges made contact with the ground. It is, however, normally held up by any suitable form of catch adapted to be instantly released by the driver; the form of catch illustrated consists of a detent lever D located in a recess $d^1$ in the guard A, and pivoted to the latter by a pin $d^2$; this lever is urged outwardly by a spring $d^3$ so that its detent edge $d^4$ engages with the metal edges $c^5$ housed in a recess $c^6$ in the extension guard. The releasing means illustrated consist of a wire mechanism E carried to a position, just in front of the driver, say on the controller, in an electric car; the operating handle $e^1$ being connected to the wire $e^2$ attached to the lever D. The front edges of the two inclined sides forming the extension guard are connected by a metal strap $c^6$, sufficient clearance being allowed to permit the rearward movement of the extension guard.

Instead of using slots and studs to connect the extension guard to the pilot guard, it may be pivotally attached to the pilot guard by levers, and the releasing means may consist of levers and rods and may be adapted to be operated by the driver's foot. The lower edge of the extension guard is provided with an elastic buffer, say rubber belting or rubber piping, and it may be covered with a soft and yielding material.

In the arrangement shown in Figs. 5 and 6, the extension guard is articulated to the guard as described, but it is normally held up by a detent-lever F, pivoted at $f^5$ and having three arms $f^1$, $f^2$ and $f^3$; the arm $f^1$ engages with a cross bar $c^7$ fixed to the extension guard, and the lever is held in the engaging position by a spring $f^4$, and is adapted to be released either by the engagement with the arm $f^2$ of the tail $g^1$ of the buffer G, when the latter meets an obstruction, or by the engagement with the arm $f^3$ of the tail $h^1$ of the punch H, when the latter is operated by the driver's foot. In this arrangement a shield K is fitted; this shield is pivoted at $f^5$ and is supported by the nose of the extension guard, being released and closing in the space between the apex of the guard and the ground when the extension guard drops.

The release of the extension guard may be caused to operate a brake, and I have shown in Fig. 5 one arrangement for effecting this. The arm $f^3$ has an extension $f^6$ which is connected, preferably by a wire $f^7$ to one end of a bell-crank lever $o^1$ the trigger $o^2$ of which normally keeps the brake block O clear of the wheel. On the release of the extension guard the trigger $o^2$ is pulled clear of O, which latter is then, under the influence of the spring $o^3$ forced into contact with the wheel. A similar arrangement may be fitted to each of the car wheels, so as to bring the car to a stand still on the release of the extension guard. If desired, the release of the extension guard may be caused to operate a brake through pneumatic or electromagnetic means.

In the modification shown in Fig. 7, the arm $f^3$ of the lever F is connected by a wire $m^1$ to a lever $m^2$, pivoted at $m^3$, and provided with a pivoted buffer M which, when an obstruction is encountered, releases the lever F, thus forming an additional safeguard. The buffer M is adapted, when in the rear, to be turned into the vertical position, as shown in dotted lines. The two sides of the extension guard are connected together by stays such as N. The lever arm $f^1$ may be fitted with an adjustable screwed shank so that its length may be varied to provide for wear of the wheels, so as to maintain the proper height at the lower edge of the extension guard. When the extension guard has been released, it is of course returned to the engaged position in any convenient manner.

Having now fully described my invention, I declare that what I claim and desire to secure by Letters Patent is;—

1. In life guards for tram cars or the like, in combination; a fixed pilot guard extending around the wheel base and carried mainly from the truck frame of the car; an extension guard articulated to but vertically movable relatively to the fixed guard, which extension guard in its upper position is clear of the roadway, and in its lower position covers in the space between the bottom of the fixed guard and the roadway; supporting means adapted to normally hold the extension guard in its upper position, and a device adapted to release the supporting means, substantially as described.

2. In life guards for tram cars or the like, in combination; a fixed pilot guard extending around the wheel base and carried mainly from the truck frame of the car, the front and rear sides of the said fixed guard converging together to form a V; an extension guard articulated to but vertically movable relatively to the said sides, which extension guard in its upper position is clear of the roadway, and in its lower position covers in the space between the bottom of the pilot guard and the roadway, supporting means adapted to normally hold the extension guard in its upper position, and a device adapted to release the supporting means, substantially as described.

3. In life guards for tram cars or the like, in combination; a fixed pilot guard extending around the wheel base and carried mainly from the truck frame of the car; an extension guard articulated to but vertically movable relatively to the pilot guard, which extension guard in its upper position is clear of the roadway, and in its lower position covers in the space between the bottom of the pilot guard and the roadway; supporting means adapted to normally hold the extension guard in its upper position, and a device adapted to release the supporting means, said device being adapted to be actuated by the driver or when an obstruction is encountered, substantially as described.

4. In life guards for tram cars or the like, in combination; a fixed pilot guard extending around the wheel base and carried mainly from the truck frame of the car; an extension guard articulated to but vertically movable relatively to the fixed guard, which extension guard in its upper position is clear of the roadway, and in its lower position covers in the space between the bottom of the fixed guard and the roadway; supporting means adapted to normally hold the extension guard in its upper position, a device adapted to release the supporting means, said device being adapted to be actuated by the driver or when an obstruction is encountered, and a brake device normally held inoperative by means which are released by the said releasing device, substantially as described.

5. In life guards for tram cars or the like, in combination; a fixed pilot guard extending around the wheel base and carried mainly from the under frame of the car; an extension guard articulated to but movable relatively to the fixed guard, which extension guard in its upper position is clear of the roadway, and in its lower position covers in the space between the bottom of the fixed guard and the roadway, supporting means adapted to normally hold the extension guard in its upper position, a device adapted to release the extension guard, said device consisting of a shaft pivoted on the fixed guard, said shaft carrying a lever adapted to hold the extension guard in its upper position, but which is released when angular movement is imparted to the shaft, means operated by the driver for imparting angular movement to the shaft, means adapted to be operated when an obstruction is encountered for imparting angular movement to the shaft, a brake normally held clear of the vehicle wheels by a detent, and a lever on the shaft of the releasing device connected to the brake releasing device and adapted to operate the latter when angular movement is imparted to the shaft, substantially as described.

6. The combination with a fixed pilot guard, of an extension guard having oblique slots formed therein and attached to said fixed guard, studs carried by said fixed pilot guard and sliding in the oblique slots of said extension guard in an elevated position and means for releasing same, substantially as described.

7. The combination with a fixed guard having a V-shaped front and rear, of an extension guard vertically movable relatively thereto, means for supporting and means for releasing said extension guard, a shield, said shield being pivoted to the fixed guard and adapted to be normally held clear of the fixed guard by the extension guard and when the extension guard is released to close in the space between the apex of the fixed guard and the ground, substantially as described.

In witness whereof I affix my signature in presence of two witnesses.

C. W. MALLINS.

Witnesses:
J. E. LLOYD BARNES,
JOSEPH E. HIRSH.

Copies of this patent may be obtained for five cents each, by addressing the "Commissioner of Patents, Washington, D. C."